3,232,310
PRESSURE RESPONSIVE VALVE
Charles F. Treder, Brookfield, Wis., assignor to Controls Company of America, Melrose Park, Ill., a corporation of Delaware
Filed July 22, 1963, Ser. No. 296,750
11 Claims. (Cl. 137—270)

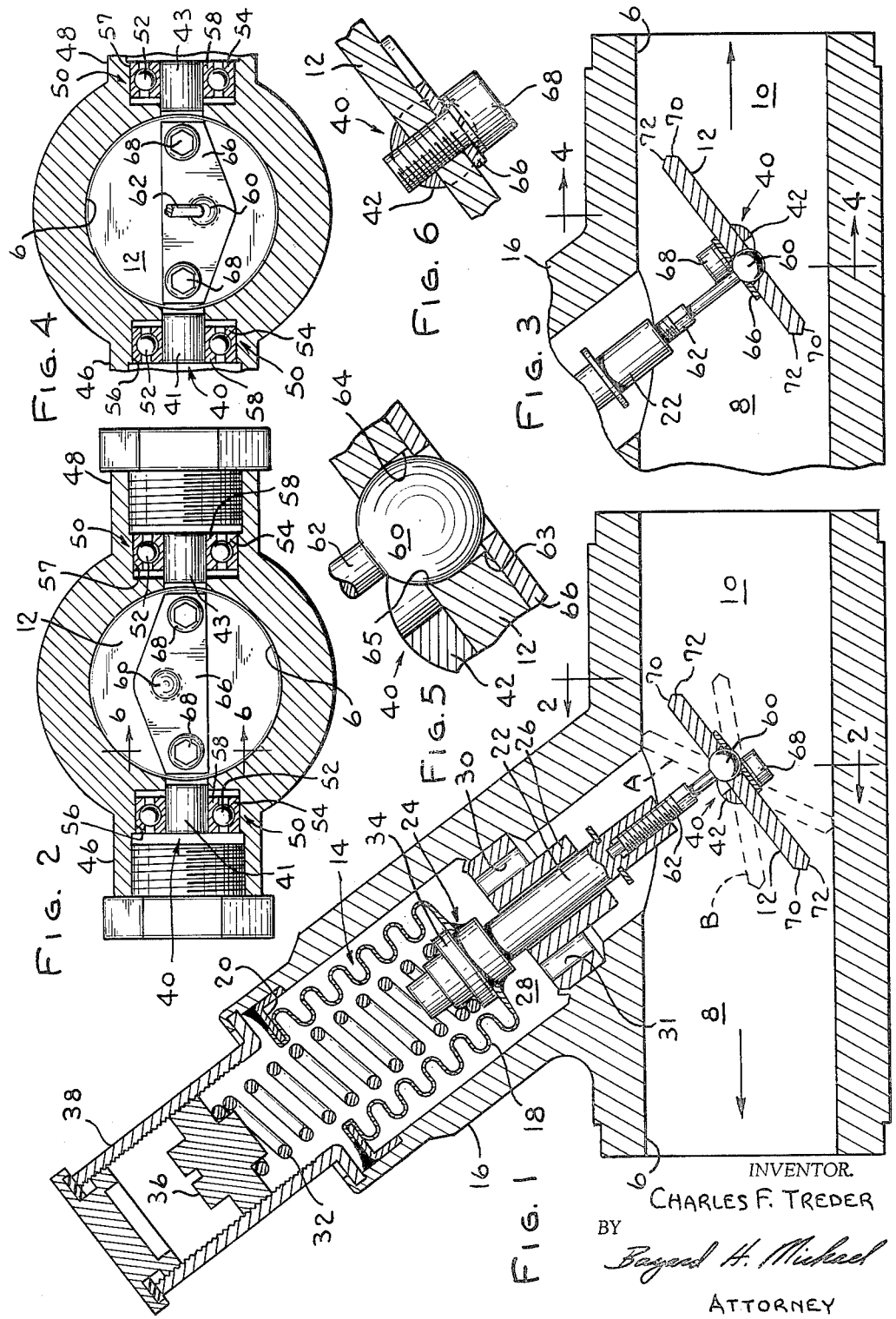

This invention relates to a pressure responsive butterfly valve construction and, more particularly, to such a valve construction which is adaptable for high pressure applications such as use in a refrigeration system.

Although recognized as a simplified and highly effective type of valve, butterfly valves have heretofore been limited to relatively low pressure applications. Among the reasons for this limitation on the use of butterfly valves was that they have generally required a relatively large power element, e.g., a bellows, to overcome the forces encountered which, in many instances, has been prohibitive.

Accordingly, one of the primary objects of this invention is to provide a pressure responsive butterfly valve for use in high pressure applications.

It has been discovered that by supporting a butterfly valve such that it assumes a balanced condition in the passage through which flow is being regulated and such that it will maintain this balanced condition in operation the butterfly valve can be adapted to high pressure applications. With a balanced valve condition, i.e., one wherein the valve member is not affected by system pressures, the forces opposing valve movement are substantially reduced and a relatively smaller power element can be used. With a balanced valve, virtually the only forces which the power element must overcome are the frictional forces of the moving parts of the valve. It has also been discovered that by mounting the valve member in anti-friction, low clearance type bearings, such as ball bearings, the balanced condition can be achieved and maintained while also reducing the frictional forces encountered in actuating the valve member.

Other considerations in the adaptation of a butterfly valve to a high pressure application are the relatively high forces which the valve element itself must resist, the provision of an adequate seal in a closed position without unduly increasing the force necessary to open the valve and, furthermore, to provide smooth opening and closing movement of the valve.

Among the objects of this invention are to provide a butterfly valve construction which will open and close smoothly; which provides a satisfactory seal in its closed position without affecting its opening or closing characteristics; and which is capable of resisting the forces encountered in a high pressure application. For the achievement of these and other objects of this invention, it is proposed to chamfer the ends of the valve element so that the valve element can have sufficient thickness to withstand the forces encountered while providing sufficient valve seating contact area to insure an adequate seal without substantially affecting the smooth opening and closing characteristics of the valve.

A still further object of this invention is to provide a butterfly valve element which is reversible and can be used with a power element intended to operate in response to either an increase or a decrease in pressure. For the achievement of this object a butterfly valve element construction is proposed wherein its point of connection with the power element is eccentrically related on the valve element with respect to its pivotal axis so that the valve is reversible with respect to its pivotal axis. Furthermore, it is proposed to use a connection between the valve element and the power element which will cooperate with the valve in either one of its alternate positions.

A further, more general object of this invention is to provide for a connection of a power element with a butterfly valve which achieves optimum valve element operating characteristics in response to movement of the power element.

The novel features of this invention are set forth in the appended claims. The invention itself, together with additional objects and advantages thereof, will be more clearly understood from a reading of the following description in connection with the accompanying drawings wherein preferred embodiments of the invention are illustrated and in which:

FIG. 1 is a section view of a valve constructed in accordance with this invention with the valve element arranged to close on an increase in pressure on the power element side of the valve element;

FIG. 2 is a section view generally along lines 2—2 of FIG. 1;

FIG. 3 is a partial view of a valve constructed in accordance with this invention illustrating the valve element connected for operation in response to a decrease in pressure on the power element;

FIG. 4 is a section view generally along lines 4—4 of FIG. 3;

FIG. 5 is an enlarged view of the ball and socket connection of the power element to the valve element; and FIG. 6 is a section view generally along lines 6—6 of FIG. 2.

With particular reference to the drawings, a pressure responsive valve constructed in accordance with this invention is illustrated as being arranged to control the flow of a suitable fluid medium through a passage 6. A valve element 12 is supported, in a manner to be described more particularly hereinafter, for movement from a fully closed position, dotted line A, to a fully open position, dotted line B, the full line showing of the valve element illustrating the valve element midway between its full open and full closed positions. For convenience, passage 6 will be discussed herein as comprising two chambers, chamber 8 to the left or on the operator side of the valve element and chamber 10 to the right of the valve element.

The pivotal axis for the valve element is located at its center so that valve 12 is balanced in passage 6 with respect to the system pressures acting on the valve. More particularly, as a fluid medium flows through passage 6 the pressure acting on valve element 12 above the pivot axis, as viewed in FIG. 1, will act in a direction tending to pivot the valve elment toward a closed position, whereas, the forces acting on the valve element below the pivot axis will be tending to move the valve element to an open position and, the forces resulting from these pressures being equal, the valve is balanced and will not move. Thus, the power element or valve actuator, when it operates to move the valve element, need not overcome any system pressures but must merely overcome the friction of the moving valve parts.

Control movement of valve element 12 is affected by pressure responsive valve operator 14 located in a housing 16 extending generally laterally of passage 6. Structurally valve operator 14 includes a suitable metallic bellows 18 connected to a flange portion 20 mounted in housing 16, preferably the bellows is connected to flange 20 by welding, or the like to provide a sealed joint therebetween. The other end of the bellows is connected to an operator stem 22 by a sealed joint 24 and operator stem 22 extends through a guide bushing 26 into passage 6 for connection with valve element 12. With this arrangement, bellows 18 is positioned in a sealed chamber 28 which is open to chamber 8 of passage 6 through ports 30 and 31 in the guide bushing. Accordingly, the pressure in chamber 28 will correspond to that in chamber 8 and the bellows will expand or collapse in accordance with that pressure to move the operator stem and actuate the valve element.

A coil spring 32 is positioned within bellows 18 and has one end seated against a shoulder 34 provided on operator stem 22 and its opposite end seated against an adjusting screw 36. Adjusting screw 36 is threaded into a valve head 38 which is connected to the outer end of housing 16 and is, therefore, movable axially in the valve head to adjust the force exerted by spring 32 on valve operator 22. Valve element 12 is then biased open by spring 32 and will be moved toward its closed position upon an increase in pressure in chamber 8 which will cause bellows 18 to collapse against the force of spring 32 and draw operator stem 22 into chamber 28 which pivots valve element 12 counterclockwise toward a closed position. The force of coil spring 32 can be adjusted by varying the position of adjusting screw 36 in valve head 38 to vary the biasing force exerted on valve disk 12 and, if desired, establish a predetermined butterfly position and pressure drop or flow across the valve. Where a particular butterfly position is preselected by adjusting screw 36, the valve will modulate at that position in accordance with the pressure in passage 6.

As was stated above, with valve element 12 being balanced in passage 6, the only forces which the power element, bellows 18 and spring 32, must overcome is the friction of the moving parts of the valve. To insure maintenance of the balanced condition and to further enhance valve operation by reducing such friction, it is preferred to mount valve element 12 in anti-friction, low clearance type bearings. More particularly, a shaft 40, including a semi-circular portion 42 extending across one of the faces of valve element 12, extends into lateral bosses 46 and 48 provided on both sides of the wall defining passage 6. The opposed ends 41 and 43 of shaft 40 are supported in bosses 46 and 48 by ball bearings 50 wherein rollers 52 are engaged between an outer race 54 pressed into machined openings 56 and 57 in bosses 46 and 48 and an inner race 58 is pressed onto ends 41 and 43 of shaft 40. With this arrangement valve element 12 is supported for pivotal movement about an axis defined by shaft 40 and in anti-friction, low clearance bearings to reduce the force required of the power element to move the valve element to its closed position. Furthermore, with the use of this type of bearing the clearance between the shaft 40 and its bearing surfaces and between the bearing and its seat is maintained at a minimum to virtually eliminate movement of valve element 12 transversely of shaft 40 which movement would have the effect of not only increasing the frictional forces to overcome in pivoting the valve element, but would also create an unbalanced condition of the valve element so that the valve operator would then have to operate against system pressures. Accordingly, the provision of anti-friction, low clearance type bearings maintains a balanced valve condition in addition to reducing the friction of the moving valve elements and it will be appreciated that bearings of this type other than ball bearings could be used if desired.

To further reduce the friction in the valve construction, a ball and socket type joint is used to connect the operator stem 22 to valve element 12. Ball 60 is connected to operator 22 through a spindle 62 which threads into the end of the operator stem. Valve element 12 includes a through opening 64 which provides a generally spherical seat for receipt of ball 60. The diameter of opening 64 varies from a larger diameter at end 63 to a relatively smaller diameter end 65 so that ball 60 seats against end 65 and is held in the opening by a retaining plate 66 which extends across the face of valve element 12 opposite to that which is engaged by shaft 40 and over larger diameter end 63. Retaining plate 66 is secured to the valve element by screws 68 which extend through the valve element and also engage shaft 40 to hold the shaft in assembled relationship on the valve element.

It will be noted that spherical seat 64 for ball 60 is eccentrically related on valve disk 12 with respect to the pivotal axis of the valve element defined by shaft 40 and the bearings. Specifically, in the illustrated embodiment the valve element comprises an elliptical disk with the pivotal axis being coincident with the minor axis thereof and with the spherical seat being off-set from the minor axis at a point on the major axis. With the ball and socket offset from the center of the valve element, the valve element is reversible so that the same valve components, operator 14 and valve element 12, can be utilized in valve construction intended for operation on an increase in pressure in chamber 8 as illustrated in FIG. 1 or on a decrease in pressure as illustrated in FIG. 3. Furthermore, it will be noted that the ball and socket joint, with retaining plate 66, are equally well suited to connecting the valve element in either one of its two alternate positions, in FIG. 1 ball 60 extends through end 63 whereas in FIG. 3 it extends through end 65 and in either case plate 66 extends over opening 63.

In FIG. 3 valve element 12 has been inverted such that the operator stem 22 extends through the opposite side of the valve element and the ball and socket connection is positioned below the pivotal axis of the valve element rather than above as in FIG. 1. The same operator assembly 14 is used with the valve element arrangement of FIG. 3 and, therefore, the biasing force on valve element 12 will again be in a counterclockwise direction urging the valve element toward a closed position, or a preselected butterfly position as discussed above. With this arrangement a decrease in pressure chamber 8 will allow the valve element to close under the influence of spring 32. It will be appreciated that the bearing mounting holes in the two arrangements are different so that two different valve housings are needed; however, it is conceivable that a single housing could be provided having two different mounting positions.

The butterfly valve will be subjected to large forces in a high pressure application and, to resist these forces, it is preferable that the valve element have a relatively thick cross section. To provide the relatively thick cross section and yet maintain smooth operating characteristics and an adequate seal-off in the closed position, the periphery of valve disk 12 is preferably chamferred with chamfer surfaces 70 and 72 being equal on opposite sides of the center of thickness of the valve element. With this arrangement an adequate surface to affect a satisfactory seal is provided but one which is not so unduly large as to interfere with smooth opening and closing of the valve. More particularly, as the valve element is either just opening or just closing a narrow passage is formed between the valve element edge and the passage wall. A Venturi effect will be created in this narrow passage which produces an increase in the force tending to move the element toward a closed position, where the valve is opening this force will resist opening movement and where it is closing it will interfere with a smooth closing of the valve. The chamfer maintains the valve element edge at a minimum and accordingly the Venturi effect is also maintained at a minimum to preserve smooth valve operation. By chamferring the valve element equally on opposite sides of the center, the reversible characteristics of the valve disk are also maintained. Thus, the chamfer surfaces permit a relatively large cross sectional thickness while maintainnig the above discussed Venturi effect to a minimum and providing an adequate seal at closing.

It will also be noted that the center of ball 60 is coincident with the center of thickness of the valve disk and that in its intermediate position, the full line position in FIG. 1, the valve element is generally perpendicular to the operator stems 22 so that maximum rotational movement of the valve element is achieved for a given amount of linear movement of the operator 14.

Although this invention has been illustrated and described in connection with particular preferred embodiments thereof, it will be apparent to those skilled in the art that various changes and modifications may be made therein without departing from the spirit of the invention or from the scope of the appended claims.

What I claim is:

1. Pressure responsive valve apparatus for controlling fluid flow through a generally circular passage, the walls of which are characterized by a pair of generally opposed openings, said valve apparatus comprising, in combination,
    a generally elliptical valve element having a major and a minor axis,
    ball bearing means supporting said valve element for movement in said passage about an axis generally coincident with one of said major and minor axes so that said valve element is balanced in said passage and said bearing means being of the low clearance type and having a pressed fit in said openings and with said valve element to prevent radial movement of said valve element with respect to said axis so that said balanced condition is maintained,
    a pressure responsive actuator exposed to and movable in accordance with the pressure in said passage,
    and ball and socket means connecting said valve element to and for movement by said actuator about said axis in response to the pressure in said passage, said ball and socket means being off-set from said one axis along the other of said major and minor axes and being reversible so that said valve element is reversible in said passage for operation in response to either an increase or decrease in pressure on said actuator.

2. Pressure responsive valve apparatus for controlling fluid flow through a passage, said valve apparatus comprising, in combination,
    a valve element,
    ball bearing means of the low clearance type supporting said valve element generally centrally thereof for pivotal movement in said passage about a generally centrally located axis so that said valve element is balanced in said passage, means defining fixed bearing seats in the walls defining said passage and said bearing means having a pressed fit in said bearing seats and with said valve element to prevent radial movement of said valve element with respect to said axis so that said balanced condition is maintained,
    a pressure responsive actuator exposed to and movable in accordance with pressure in said passage,
    and ball and socket means connecting said valve to and for movement by said actuator about said axis in response to the pressure in said passage, said ball and socket means being off-set from said axis along a generally centrally located line extending generally perpendicular to said axis and being reversible so that said valve element is reversible in said passage for operation in response to either an increase or decrease pressure of said actuator.

3. The pressure responsive valve apparatus of claim 2 wherein the peripheral edge of said valve element is characterized by substantially equal chamfer portions on opposed sides of a plane extending through the center of thickness of said valve element.

4. The pressure responsive valve apparatus of claim 2 wherein the center of the ball of said ball and socket means is substantially coincident with the center of said valve element and wherein said valve element is movable between a full opened and a full closed position and said ball and socket connecting means is arranged relative to said valve element so that, when said valve element is midway between said full opened and closed positions, said valve element is substantially perpendicular to the line of action of said actuator.

5. The pressure responsive valve apparatus of claim 2 wherein said ball and socket means includes a generally spherical seat in said valve element and opening on both sides of said valve element and spindle means connected to said ball, said seat characterized by narrowing from an opening in one side of said valve element of sufficient size to pass said ball to a smaller opening in the other side of said valve of insufficient size to pass said ball but sufficient to pass said spindle means, and a retaining plate connected to aid one side of said valve element said valve element to hold said ball assembled in said spherical seat.

6. Pressure responsive valve apparatus for controlling fluid flow through a passage, said valve apparatus comprising, in combination,
    a valve element,
    means supporting said valve element for pivotal movement in said passage,
    a pressure responsive actuator exposed to and movable in accordance with the pressure in said passage,
    and means connecting said actuator to said valve element for movement by said actuator about said axis and including a ball and socket connection to said valve element at a point off-set from said axis along a generally centrally located line extending generally perpendicular to said axis, said ball and socket connection comprising a generally spherical seat in said valve element opening on both sides of said valve element and characterized by narrowing from an opening on one side of said valve element of sufficient size to pass said ball to a smaller opening on the other side of said valve element of insufficient size to pass said ball but sufficient to receive said spindle means, and a retaining plate releasably connected to said valve element at the larger of said opening for holding the ball in said seat.

7. The pressure responsive valve apparatus of claim 6 wherein said valve element is movable between a full opened and full closed position and is arranged so that at the midpoint of its travel between the full opened and full closed position the valve element is generally normal to the line of action of the actuator and wherein the center of said ball is coincident with the center of thickness of said element.

8. Pressure responsive valve apparatus for controlling fluid flow through a passage, said valve apparatus comprising, in combination,
    a valve element,
    shaft means engaging said valve element and defining a generally centrally located axis for said valve element,
    a pair of bearing means of the low clearance type and including first and second races,
    means defining bearing receiving means operatively associated with said passage and complementary to said second races,
    said first races having a pressed fit with said shaft means and second races having a pressed fit with said bearing receiving means thereby supporting said valve for pivotal movement in said passage in balanced condition and against radial movement with respect to said pivotal axis to maintain said balanced valve condition,
    a pressure responsive actuator exposed to and movable in accordance with the pressure in said passage,
    and means connecting said pressure responsive actuator to said valve element for movement of said valve element in accordance with the pressure in said passage.

9. The pressure responsive valve mechanism of claim 8 wherein said valve element is characterized by a chamferred peripheral edge for movement with said passage.

10. The pressure responsive valve mechanism of claim 8 wherein said connecting means engages said valve element at a point off-set from said pivotal axis along a generally centrally located line extending generally perpendicular to said pivotal axis and wherein said connecting means is reversible with respect to said valve element so that said valve element is reversible in said passage for operation either in response to an increase or decrease in pressure on said actuator.

11. The pressure responsive valve mechanism of claim 8 wherein said bearing means comprise ball bearings.

References Cited by the Examiner

UNITED STATES PATENTS

| | | | |
|---|---|---|---|
| 2,021,408 | 11/1935 | Feinberg | 251—305 X |
| 2,114,168 | 4/1938 | Auger | 251—305 |
| 2,121,707 | 6/1938 | McGee | 251—86 |
| 2,308,861 | 1/1943 | Clifford | 251—86 |
| 2,345,952 | 4/1944 | Smith | 308—236 X |
| 2,596,787 | 5/1952 | Ottinger et al. | 251—305 |
| 2,946,554 | 7/1960 | Asker et al. | 251—306 |
| 3,059,897 | 10/1962 | Jensen | 251—308 |
| 3,066,694 | 12/1962 | Schutmaat et al. | 137—505.36 |

FOREIGN PATENTS 760,111  9/1952  Germany.

M. CARY NELSON, *Primary Examiner.*

HENRY T. KLINKSIEK, *Examiner.*

UNITED STATES PATENT OFFICE
CERTIFICATE OF CORRECTION

Patent No. 3,232,310                            February 1, 1966

Charles F. Treder

It is hereby certified that error appears in the above numbered patent requiring correction and that the said Letters Patent should read as corrected below.

Column 5, line 15, before "movement" insert -- pivotal --; line 59, for "of" read -- on --; line 67, after "center" insert -- of thickness --; column 6, line 10, for "aid" read -- said --; lines 10 and 11, strike out "said valve element", second occurrence; line 25, after "axis" insert -- and spindle means connected to said ball --; line 35, for "the" read -- said --; line 43, before "element" insert -- valve --; line 71, for "movement" read -- engagement --.

Signed and sealed this 10th day of January 1967.

(SEAL)
Attest:

ERNEST W. SWIDER                                    EDWARD J. BRENNER
Attesting Officer                                             Commissioner of Patents